(12) United States Patent
Lu et al.

(10) Patent No.: US 8,246,778 B2
(45) Date of Patent: Aug. 21, 2012

(54) METHOD FOR CONTROLLING ENZYMATIC DECOMPOSITION OF PEROXIDE

(75) Inventors: Chen Lu, Germantown, TN (US); Janet Woodward, Bartlett, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 132 days.

(21) Appl. No.: 12/621,615

(22) Filed: Nov. 19, 2009

(65) Prior Publication Data

US 2010/0126680 A1  May 27, 2010

Related U.S. Application Data

(60) Provisional application No. 61/116,771, filed on Nov. 21, 2008.

(51) Int. Cl.
  *D21C 5/02* (2006.01)
(52) U.S. Cl. .................................. 162/6; 162/5; 162/78
(58) Field of Classification Search .................. 162/6, 78
  See application file for complete search history.

(56) References Cited

U.S. PATENT DOCUMENTS

| 3,556,932 | A | * | 1/1971 | Coscia et al. ................ 162/166 |
| 5,447,602 | A | * | 9/1995 | Sajbel et al. .................... 162/6 |
| 5,543,446 | A |   | 8/1996 | Rodriguez |
| 5,728,263 | A |   | 3/1998 | Mattila et al. |
| 5,885,412 | A |   | 3/1999 | Paart et al. |
| 6,432,262 | B1 |   | 8/2002 | Ney et al. |
| 2006/0003943 | A1 | * | 1/2006 | Underiner et al. .............. 514/18 |
| 2007/0246175 | A1 | * | 10/2007 | Horacek et al. ................... 162/5 |

FOREIGN PATENT DOCUMENTS

| GB | 2269191 A | 2/1994 |
| WO | 2000011046 A1 | 3/2000 |
| WO | 2001094692 A2 | 12/2001 |
| WO | 2005001056 A2 | 1/2005 |
| WO | 2006032450 A1 | 3/2006 |

OTHER PUBLICATIONS

Migneault et al., Glutaraldehyde:behavior in aqueous solution, reaction with protein, and application to enzyme crosslinking, 2004, BioTechniques, 37, 790-802.*

International Search Report and Written Opinion issued in corresponding International Patent Application No. PCT/US2009/065047 dated Apr. 29, 2010 (13 pages).

* cited by examiner

*Primary Examiner* — Anthony Calandra
(74) *Attorney, Agent, or Firm* — Kilyk & Bowersox, P.L.L.C.

(57) ABSTRACT

A method is described controlling enzymatic decomposition of peroxide comprising contacting a composition containing a peroxide decomposing enzyme with an aldehyde functional polymer added in an amount effective to control the enzyme. There also is a method described for bleaching cellulose pulp, such as recycled paper pulp or other pulps, with an aldehyde functional polymer introduced in an amount effective to control peroxide decomposing enzymes present in the pulp being bleached. Paper products containing the aldehyde functional polymer used to control peroxide decomposing enzymes in a bleaching treatment of cellulose pulp are also provided.

23 Claims, No Drawings

METHOD FOR CONTROLLING ENZYMATIC DECOMPOSITION OF PEROXIDE

This application claims the benefit under 35 U.S.C. §119(e) of prior U.S. Provisional Patent Application No. 61/116,771, filed Nov. 21, 2008, which is incorporated in its entirety by reference herein.

BACKGROUND OF THE INVENTION

The present invention relates to methods of controlling enzymatic decomposition of peroxide, and, particularly, methods for controlling enzymatic decomposition of peroxide in bleaching treatments of cellulose pulp, and paper products of these methods.

Hydrogen peroxide is widely used in industrial and domestic applications. Hydrogen peroxide is extensively used, for example, in the production of pulp, such as in the production of recycled pulp, to enhance pulp and paper brightness by bleaching. Hydrogen peroxide, however, is readily decomposed in the presence of certain enzymes, such as catalase, present in water from processing recycled paper or other organic matters. In paper recycling mills, for example, mill pulp slurries and white water can harbor microorganisms, which produce enzymes that can catalyze the decomposition of hydrogen peroxide. The hydrogen peroxide treatment, as a result, can become hampered and bleaching effectiveness is reduced. For example, one of these enzymes, catalase, can rapidly catalyze the decomposition of hydrogen peroxide into oxygen and water. It has been reported that one catalase molecule can decompose 40,000 peroxide molecules at 0° C. in one second (the *Encl. of Biochemistry*, Roger J. Willams, et al., eds., page 634). As a result, increased dosages of hydrogen peroxide must be added in efforts to offset peroxide losses to enzymatic decomposition and achieve the desired brightness in the product. Previous efforts have been attempted for inhibiting catalase activity in the presence of hydrogen peroxide.

U.S. Pat. No. 5,728,263 relates to a method of inhibiting enzymatic decomposition of peroxide that involves producing and treating recycled fiber pulp and other fiber pulp with peroxide, wherein free dialdehydes, such as glutaraldehydes, and acetals thereof are included to inhibit enzymatic decomposition of the peroxide. The amount of the dialdehyde or acetal used for the production of recycled fiber pulp or other fiber pulp can be 0.05 to 2 kg per ton of produced fiber pulp based on dry weight.

WO 2005/001056 A2 relates to a method for controlling a catalase contamination that involves contacting a composition comprising catalase activity and/or a composition comprising a catalase producing microorganism with a protease in an amount effective to reduce catalase activity in the composition and/or to prevent an increase in catalase activity in the composition.

WO 2006/032450 A1 relates to the use of HCHO-releasing chemicals for the inactivation of enzymes, wherein the enzyme is catalase, amylase, protease, or cellulose. Examples of the HCHO-releasing chemicals are 1,3,5-tris-(2-hydroxyethyl)-1,3,5-hexahydrotriazine (HT) and imidazo[4,5-d]imidazol-2,5-(1H, 3H)-dione-tetrahydro-1,3,4,6-tetrakis-(hydroxymethyl) (TD).

U.S. Pat. No. 6,432,262 B1 relates to a method of stabilizing hydrogen peroxide in an aqueous solution, such as a circulating water slurry, which involves adding an aldehyde donor, such as a methylolhydantoin, to the solution (or slurry). U.S. Pat. No. 6,432,262 B1 states that suitable aldehyde donors include, but are not limited to, imidazolidinyl urea, Quaternium-15, diazolidinyl urea, bromonitropropanediol, methenamine, 5-bromo-5-nitro-1,3-dioxane, sodium hydroxymethyl-glycinate, 3,5-dimethyl-1,3,5,2H-tetrahydrothiadiazine-2-thione,hexahydro-1,3,5-tris(2-hydroxyethyl)triazine, hexahydro-1,3,5-triethyl-s-triazine, polymethoxy bicyclic oxazolidine, tetrakis(hydroxymethyl) phosphonium sulfate, methylolhydantoins, and any combination of any of the foregoing. This patent further states that preferred aldehyde donors include, but are not limited to, methylolhydantoins, such as monomethyloldimethylhydantoins (MMDMHs), dimethyloldimethylhydantoins (DMDMHs), and any combination of any of the foregoing. Examples of methylolhydantoins include, but are not limited to, 1-hydroxymethyl-5,5-dimethylhydantoin (a MMDMH), 3-hydroxymethyl-5,5-dimethylhydantoin (a MMDMH), and 1,3-bis(hydroxymethyl)-5,5-dimethylhydantoin (DMDMH) mixtures.

U.S. Pat. No. 5,885,412 relates to a method and composition for suppressing or inhibiting the decomposing action of enzymes on hydrogen peroxide, e.g. peroxidase and catalase, during bleaching of cellulose fibers with hydrogen peroxide, especially in connection with the production of recycled paper, in such a way that microorganisms are not markedly affected, and discharges that are dangerous to the environment are minimized. The composition contains hydroxylamine, thiocyanate salts, formic acid, ascorbic acid or nitrites.

GB 2269191 A relates to a process for treating aqueous process liquors, e.g., in waste paper recycling, which contains catalase positive microorganisms and reducing the rate of hydrogen peroxide decomposition by catalase which employs an organic peracid as a biocide with the process liquor at acidic or neutral pH.

SUMMARY OF THE PRESENT INVENTION

A feature of the present invention is to provide methods to control enzymatic decomposition of peroxide in compositions.

A further feature of the present invention is to provide methods to control enzymatic decomposition of peroxide in compositions with active agents that are effective in lower dosage amounts than previous agents.

Another feature of the present invention is to provide methods for controlling enzymatic decomposition of peroxide in bleaching treatments of cellulose pulp, such as recycled paper pulp or other pulps.

An additional feature of the present invention is to provide paper products containing active agents used to control peroxide decomposing enzymes in a bleaching treatment of cellulose pulp.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method of controlling enzymatic decomposition of peroxide comprising contacting a composition comprising at least one peroxide decomposing enzyme with an aldehyde functional polymer added in an amount effective to control the at least one peroxide decomposing enzyme.

It has been found that the aldehyde functional polymers are more effective than the corresponding free aldehydes for controlling peroxide decomposing enzymes. As a result, lower amounts of the aldehyde functional polymer as active ingredients are sufficient in order to obtain the same brightening effect. The aldehyde functional polymer can, for example, provide comparable catalase de-activation performance (such as brightening) as compared to glutaraldehyde at about 15% (1/6.7) by weight of the glutaraldehyde usage level. Further, the aldehyde-containing polymers represent an alternative to conventional inhibitors of peroxide decomposing enzymes, such as glutaraldehyde, which may be or become limited in supply and availability. The enzymes that can be controlled by the method of the present invention include, for example, catalase, peroxidase, protease, amylase, cellulase, or a combination thereof, or other peroxide decomposing enzymes.

The present invention further relates to a method of controlling enzymatic decomposition of peroxide in a composition containing a peroxide decomposing enzyme with an aldehyde functional polymer that is the reaction product of at least one aldehyde and at least one polyvinylamide. The polyvinylamide can be, for example, a polyacrylamide. The polyacrylamide can optionally include ionic or nonionic units other than vinylamide units. The aldehyde can be selected, for example, from formaldehyde, glutaraldehyde, glyoxal, malonic dialdehyde, succinic dialdehyde, glutaraldehyde, adipic dialdehyde, 2-hydroxyadipic dialdehyde, pimelic dialdehyde, suberic dialdehyde, azelaic dialdehyde, sebacic dialdehyde, maleic aldehyde, fumaric aldehyde, phthalaldehyde, isophthalaldehyde, terephthalaldehyde, and/or 1,4-diformylcyclohexane.

The medium or composition to be treated can be, for example, a water process stream in a recycling mill, a textile treatment process, a bleaching process, a pulping process, or a deinking process. The aldehyde functional polymer can be added to the composition to be treated before, after, and/or simultaneous with addition of peroxide thereto. The composition to be treated can comprise a cellulose pulp. The cellulose pulp can be, for example, kraft pulp, sulfite pulp, sulfate pulp, soda pulp, mechanical pulp, thermomechanical pulp, chemothermomechanical pulp, recycled paper pulp, or a combination thereof.

The present invention also relates to a method for bleaching cellulose pulp from recycled paper, comprising treating a recycled fiber pulp with an aldehyde functional polymer introduced in an amount effective to control peroxide decomposing enzymes present in the pulp, and bleaching the recycled fiber pulp with hydrogen peroxide. The aldehyde functional polymer can be introduced into process water, raw feed water, and/or into a pulper used for the production of the recycled fiber pulp. Examples of effective amounts of aldehyde-functional polymer, such as illustrated for pulp bleaching or brightening treatments, include its addition in an amount of from about 1 ppm to about 8,000 ppm, or from about 5 ppm to about 4000 ppm, or from about 10 ppm to about 2000 ppm. The present invention further relates to paper products containing aldehyde functional polymer used to control peroxide decomposing enzymes in a bleaching treatment of cellulose pulp.

It is to be understood that both the foregoing general description and the following detailed description are exemplary and explanatory only and are intended to provide a further explanation of the present invention, as claimed.

As used herein, "control", or variants such as "controls" or "controlling", refers to a reduction in the decomposition of peroxide, such as hydrogen peroxide, in a composition which contains a peroxide decomposing enzyme and peroxide. The amount of reduction can be measured in relative terms by determining the peroxide level in a composition containing a peroxide decomposing enzyme, peroxide, and an aldehyde functional polymer, in comparison to the same composition without the presence of the aldehyde functional polymer, for a similar monitoring period. The peroxide levels can be assayed by conventional means used for that purpose. The mechanism of the "control" affected on the enzymes is not particularly limited. It can at least partly reduce or prevent the affects of the enzymes to catalyze decomposition of peroxide, and does not require or exclude control of the microorganisms per se that produce the enzymes.

As used herein "polymer" refers to a compound comprised of a chain and/or branching matrix having monomeric units (mers). Examples are homopolymers, co-polymers (including block copolymers and graft copolymers), dendritic polymers, crosslinked polymers, star polymers, oligomers, and the like.

For purposes herein, "aldehyde functional" refers to polymer including at least one substituent or moiety containing aldehyde.

"Bleaching" refers to removal of color from pulp.

"Brightness" is a measure of how much light is reflected by paper under specified conditions and is usually reported as a percentage of how much light is reflected. A higher brightness number thus generally represents a brighter or whiter paper. The TAPPI T 452 or T 525 standards, or ISO standards, can be used as measures of brightness.

DETAILED DESCRIPTION OF THE PRESENT INVENTION

The present invention relates to a method for controlling peroxide decomposing enzymes in a composition, or a system or process using the composition, with an aldehyde functional polymer. The aldehyde functional polymer can be used, for example, in a composition in which peroxide is used for bleaching or brightening of cellulose pulp. They exhibit better performance in controlling peroxide decomposing enzymes as compared to other compounds such as free aldehydes.

The aldehyde functional polymer used in methods of the present invention can be, for example, a polymer comprising a vinylamide backbone and one or more aldehyde-containing substituents attached thereto. In one aspect, the aldehyde functional polymer can be the reaction product of an aldehyde-reactive vinylamide base polymer and free aldehyde. The aldehyde-reactive vinylamide polymer can be, for example, an aldehyde-reactive acrylamide polymer. The base polymer has sites available on its structure for functionalization with an aldehyde. These sites can be, for example, pendant groups and/or terminal groups attached to the backbone, such as pendant amide side groups attached to a vinylamide polymer backbone. An acrylamide base polymer can be comprised of primary amide-containing monomers such as acrylamide, methacrylamide, ethylacrylamide, crotonamide, N-methyl acrylamide, N-butyl acrylamide, N-ethyl methacrylamide, or any combinations thereof. Thus, polyacrylamides, which by definition are polymers made from acrylamide monomers, include repeating units from at least one or more of these various compounds. As indicated, the acrylamide monomers can provide the primary reaction sites on the base polymer backbone to which the aldehyde substituents are attached. Acrylamide polymers can be made by well-known conventional means, and are commercially available. A polyacrylamide base polymer can have, for example, a molecular weight ranging from about 100 Daltons to 100,000 Daltons, for example, from about 1,000 Daltons to about 50,000 Daltons, or, for example, from about 3,000 Daltons to 13,000 Daltons.

The vinylamide base polymers also can optionally include, in addition to the vinylamide units, other monomers and units, such as ionic units that impart charge (such as anionic units and/or cationic units), nonionic units other than vinylamide units, spacer units, and/or non-aldehyde reactive non-nucleophilic units, provided that sufficient vinylamide units remain available for reaction with an aldehyde for aldehyde functionalization of the base polymer. If included, anionic monomers can be, for example, $\alpha,\beta$-unsaturated carboxylic acids having from 3 to 5 carbon atoms and salts thereof. Suitable anionic monomers can be, e.g., acrylic acid, methacrylic acid, itaconic acid and salts thereof. If included, cationic monomers can be, for example, unsaturated monomers containing amino groups or quaternary ammonium groups. Cationic sites are also optionally obtainable by forming salts of some of the amino groups with mineral acids. Unsaturated cationic monomers include, for example, diallyldimethylammonium chloride (DADMAC), 2-vinylpyridine, 2-vinyl-N-methylpyridinium chloride, (p-vinylphenyl)trimethyl ammonium chloride, diallyldimethylammonium chloride, 2-(dimethylamino)ethyl acrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate, and 3-acrylamido-3-methylbutyl trimethyl ammonium chloride. Amphoteric base polymers also optionally can be provided. The total amount of ionic monomers and nonionic monomers different from acrylamide can be from 0% to about 90% by weight or from about 1% to about 50%, or from about 10% to 40% by weight of the base polymer. In one aspect, up to 50% weight total anionic monomers and/or nonionic monomers other than vinylamide can be included in the base polymer without inclusion of cationic monomers. Although not desiring to be bound to any theory, negative charge or no charge on the aldehyde functional polymer can be preferable when using the polymer as part of bleaching treatments conducted on cellulose pulps. Vinylamide polymers containing ionic units can be prepared in conventional manners, for example, by free-radical initiated polymerization of acrylamide and an ionic monomer. Methods for making ionic vinylamide base polymers are disclosed, for example, in U.S. Pat. No. 3,556,932, U.S. Pat. No. 5,543, 446, and WO 00/11046, which are incorporated herein by reference.

The aldehyde which is reacted with the base polymer can be a monoaldehyde, a dialdehyde, or other aldehyde. The aldehyde preferably is reacted with the base polymer as a free aldehyde compound. The dialdehydes can be C2 to C8 saturated or unsaturated dialdehydes. The aldehyde can be selected, for example, from formaldehyde, glutaraldehyde, glyoxal, malonic dialdehyde, succinic dialdehyde, glutaraldehyde, adipic dialdehyde, 2-hydroxyadipic dialdehyde, pimelic dialdehyde, suberic dialdehyde, azelaic dialdehyde, sebacic dialdehyde, maleic aldehyde, fumaric aldehyde, phthalaldehyde, isophthalaldehyde, terephthalaldehyde, and 1,4-diformylcyclohexane, or combinations thereof. As indicated, the aldehyde can be one that reacts with an amide group of a vinylamide unit on the base polymer. The amount of aldehyde used for the reaction can be at least from about 0.01 moles up to about 0.99 moles for each mole of vinylamide moiety (e.g., acrylamide) contained in the base polymer, or at least about 0.05 moles up to about 0.7 moles, or at least about 0.1 moles up to about 0.5 moles for each mole of vinylamide moiety in the base polymer.

An aldehyde functionalized vinylamide can be prepared, for example, by reacting free aldehyde with a vinylamide base polymer, such as a polyacrylamide base polymer, in dilute aqueous solution. The reaction between the aldehyde and base polymer can be carried out under alkaline conditions (that is, a pH>7), and a temperature of from about 20° C. to about 50° C. under approximately one atmosphere of pressure for a set period of time to allow sufficient aldehyde to react with base polymer. In one aspect, the pH condition of the reaction is maintained in the range of from 7.1 to 11. A buffer can be added to control solution pH throughout the reaction. Suitable buffers include sodium phosphates, sodium pyrophosphate, borax, and Tris. Alternatively, either the aldehyde solution or the base polymer solution can be added to the reaction mixture slowly over time, or, both the aldehyde and the base polymer solution can be added to the reaction mixture slowly over time. The final pH of the solution upon quench can range, for example, from about 2 to about 5. At the completion of the reaction, the reaction solution can, for example, contain about 1 to about 20% by weight aldehyde functional polymer solids. The aldehyde functional polymer product can be isolated from any unreacted free aldehydes by HPLC method. The aldehyde functional polymer can be stably stored and handled in aqueous solution. The aldehyde functional polymers also are preferably soluble in water or in aqueous formulations comprising at least 50% by weight of water together with any other solvents present that are miscible with water. For purposes of storage and handling, polymer solids levels in the solutions can be, for example, about 1% weight to about 20% by weight. Also, the pH of the solution can be adjusted to about 2 to about 5 for storage and handling.

A non-limiting example of a method for reacting a polyacrylamide base polymer with an aldehyde to produce an aldehyde functional polymer that can be used in the practice of methods of the present invention, is shown below.

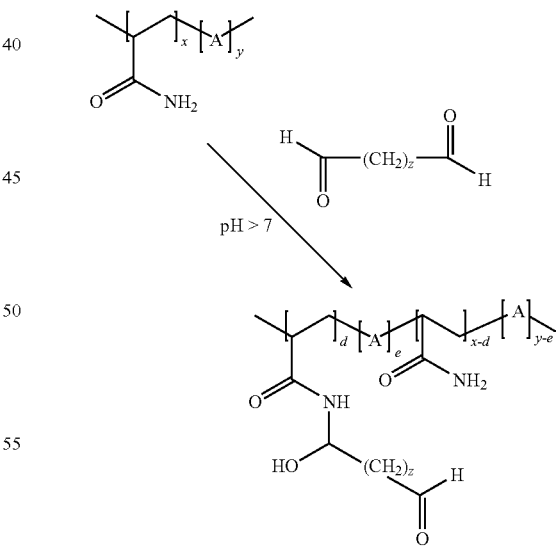

Referring to the above formula, in the base polymer the weight percent of x of the acrylamide unit is from about 10% to about 100% or from about 25% to about 90%, and the weight percent of y of an optional unit "A" is from about 90% to 0% by weight or from about 50% to about 1%, of the base polymer. The polymer backbone can include at least 10, or at least 50, or at least 100, or at least 1,000 or more acrylamide units (e.g., 10-1,000, 100-1,500, 150-2,000). The unit "A" is an optional ionic unit or nonionic unit different from acrylamide, which can be included. The ionic unit, if included, preferably is anionic. A nonionic unit for "A", if included, also can be a monomer that is different from an acrylamide. Combinations of anionic, cationic, and/or nonionic units other than acrylamide optionally can be used for unit "A" in the backbone. The coefficient "d" represents the amount of acrylamide units in the base polymer that are substituted with an aldehyde. The coefficient "d" can be a value selected such that the aldehyde-substituted vinyl amide monomer units represent at least about 5% by weight, or at least about 20% by weight, or at least about 40% by weight, or at least about 50% by weight, or at least about 60% by weight, of the aldehyde-substituted polymer. The coefficient "e" refers to "A" units adjacent aldehyde-substituted vinyl amide units. The coefficient "z" of the aldehyde reactant can be 0-6, such as 1-5, 2-5, 3-5. The aldehyde can be selected, for example, from the above-indicated aldehydes, such as formaldehyde (HCHO), glutaraldehyde (z=3), and glyoxal (z=0). As indicated, the reaction can be conducted under alkaline conditions at room temperature under atmospheric pressure, and then the product is acid stabilized. The aldehyde functionalized polymer can, for example, have a molecular weight ranging from about 500 Daltons to about 100,000 Daltons, for example, from about 3,000 Daltons to about 50,000 Daltons, for example, from about 5,000 Daltons to about 20,000 Daltons, or, for example, from about 5,000 Daltons to about 15,000 Daltons. The aldehyde functional vinylamide polymer products of the reaction can be readily employed or stored for later use in the manufacture of paper. As indicated, the aldehyde functional polyacrylamide products can be stored and handled as aqueous solutions.

In using the aldehyde functional polymers in methods according to the present invention, they can be added to protect any medium or composition containing a microorganism that produces peroxide decomposing enzymes, and/or a medium that already contains the enzyme. The medium to be protected generally can be a solution, formulation, dispersion, slurry, suspension, or the like. The medium can be, for example, a pulp, a papermaking slurry, a mineral slurry or white water. The medium to be protected can be the process medium used in a production process and/or treatment of pulp, and especially a medium treated or to be treated with hydrogen peroxide or other peroxides as bleaching agent. The pulp can be virgin pulp, recycled pulp or a combination thereof. Such media typically comprise fibers, water, hydrogen peroxide, and other additives. Catalase may be generated in such media by microbial action which in turn catalyses the decomposition of hydrogen peroxide. If left untreated, it would reduce the effectiveness of a peroxide or bleaching treatment process. Thus, the treatment of the medium with the aldehyde functional polymer is preferably performed prior to and/or simultaneously with addition of hydrogen peroxide in order preempt enzymatic activity on the peroxide. Additional or other addition times can be used. Other examples of media that can become contaminated with catalase comprise adhesive and starch based formulations, formulations for leather soaking or formulations for the treatment of textiles. Although catalase is illustrated, other peroxide decomposing enzymes such as peroxidase, protease, amylase, or cellulase, or any combination thereof, can be controlled with the indicated aldehyde functional polymers.

The aldehyde functional polymer treatment, for example, can be applied in any suitable stage in a pulp and paper mill, such as, in pulping, deinking and/or bleaching or in any other process in which peroxide or other bleaching treatment is used which can be compromised by microbial catalase production and activity. The pulp to be treated can be, for example, kraft pulp, sulfite pulp, sulfate pulp, soda pulp, mechanical pulp, thermomechanical pulp, chemothermomechanical pulp, recycled paper pulp, or a combination thereof. Typical pulp slurries in paper applications can contain, for example, from about 0.2 to about 18% by weight of organic matter, based upon 100% total weight of slurry. The organic matter is typically comprised of wood fiber (or pulp) and adjuvants, such as sizing and starch. Generally, the organic matter comprises from about 90 to about 99% by weight of wood fiber (or pulp), based upon 100% total weight of organic matter. The wood fiber preferably can at least partially be derived from recycled paper. The pulp slurry may also contain other adjuvants known in the art. Examples of such adjuvants include, but are not limited to, algaecides; sodium hydroxide (or other caustic); peroxide stabilizers, such as sodium silicate, magnesium sulfate, and polyphosphates; chelating agents, such as EDTA; fatty acids; and combinations thereof.

The aldehyde functional polymer is added to a catalase contaminated system or process, or one at risk of such contamination, in an amount effective to control the catalase activity. The aldehyde functional polymer can be introduced into process water, raw feed water, and/or into a pulper used for the production of fiber pulp. The aldehyde functional polymer can be added, for example, in a water loop of the paper mill and can be allowed to run throughout the system. For example, the aldehyde functional polymer can be added at a selected point(s) in the water loop, and the concentration of the aldehyde functional polymer can be increased to a desired level to control the catalase contamination throughout the system. Examples of effective amounts of the aldehyde functional polymer, such as illustrated for pulp bleaching or brightening treatments, include its addition in an amount of from about 1 ppm to about 8,000 ppm, or from about 5 ppm to about 4,000 ppm, or from about 10 ppm to about 2,000 ppm, wherein the ppm is based on the concentration of aldehyde-functional polymer in the system. The dosage of the aldehyde-functional polymer can be maintained at a constant or substantially constant amount, or, alternatively, it can be varied. In some embodiments, for example, the dosage of the aldehyde-functional polymer can be varied, such as by adding a greater amount in the beginning of a treatment of a system or process with the aldehyde-functional polymer, and then lowering the dosage over time.

The aldehyde functional polymer can be introduced into a process system to be treated by itself or in combination with other process chemicals and additives. As indicated, the aldehyde functional polymer can be introduced via an aqueous solution or carrier. For pulp bleaching processes and systems, for example, the aldehyde functional polymer can be used at a pH value above about 4, for example, from 4 to about 14, for example, from about 6 to about 12, for example from about 7 to about 11. As indicated, the aldehyde functional polymers also are preferably soluble in water or in aqueous formulations comprising at least 50% by weight of water optionally together with other solvents miscible with water.

As indicated, the aldehyde functional polymers are especially useful for use in conjunction with bleaching treatments of recycled pulps, which tend to contain large amounts of organic matters that can generate peroxide decomposing enzymes. Recycled pulp generally can be bleached with the same chemicals used to bleach virgin pulp. There are three categories of paper that generally can be used as feedstocks for making recycled paper: mill broke, pre-consumer waste, and post-consumer waste. Mill broke is paper trimmings and other paper scrap from the manufacture of paper, and is recycled internally in a paper mill. Pre-consumer waste is material that was discarded before it was ready for consumer use. Post-consumer waste is material discarded after consumer use, including OM (old magazines), OTD (old telephone directories), and RMP (residential mixed paper). Paper suitable for recycling is called "scrap paper." While there are differences depending on the specific type of paper being recycled (e.g., corrugated fiberboard, newspaper, mixed office waste), paper recycling processes generally may include the following steps:

(a) pulping: adding water and applying mechanical action to separate fibers from each other;
(b) screening: using screens, with either slots or holes, to remove contaminants that are larger than pulp fibers;
(c) centrifugal cleaning: spinning the pulp slurry in a cleaner causes materials that are denser than pulp fibers to move outward and be rejected;
(d) flotation: passing air bubbles through the pulp slurry, with a surfactant present, causes ink particles to collect with the foam on the surface, and by removing contaminated foam, pulp is made brighter, and this step is sometimes called deinking;
(e) kneading or dispersion: mechanical action is applied to fragment contaminant particles;
(f) washing: small particles are removed by passing water through the pulp;
(g) bleaching: bleaching, such as using peroxide, to remove color from the pulp; and,
(h) papermaking: the clean and bleached fiber can be made into a new paper product in the same way that virgin paper is made.

The aldehyde functional polymer preferably is introduced into the paper recycling process so that it can become uniformly mixed with process materials, such as pulp, before or simultaneous with addition of peroxide bleaching agents thereto. Alternatively, or in addition thereto, aldehyde functional polymer can be introduced into the recycled process water stream, such as, for example, the recycled process water stream in the de-inking plant. Other water streams or systems in a pulp bleaching system also can be treated.

It has been observed that the aldehyde functional polymers are more effective than the free aldehydes for controlling peroxide decomposing enzymes. Lower amounts of active ingredients can be used in methods of the present invention to obtain the same brightening effect. The aldehyde functional polymer can, for example, provide comparable catalase de-activation performance (such as brightening) as compared to glutaraldehyde at about 15% (1/6.7) by weight of the glutaraldehyde usage level.

Paper products containing the aldehyde functional polymer used to control peroxide decomposing enzymes in a bleaching treatment of cellulose pulp are also provided.

The control of peroxide decomposing enzymes with aldehyde-functional polymers described above has been confirmed using standard laboratory techniques as illustrated below. The following examples are intended to illustrate, not limit, the present invention. In the following examples, all parts are proportions by weight unless otherwise specified.

EXAMPLES

Materials

A commercial catalase (TERMINOX® Ultra 50L) was obtained from Novozymes A/S (Bagsvaerd, Denmark). Glyoxalated polyacrylamides (BUBOND® 387, BUBOND® 644, BUBOND® 376, BUBOND® 376C) were obtained as commercial products from Buckman Laboratories (Memphis, Tenn. USA). 50% hydrogen peroxide solution was obtained from Fisher Scientific. Papermaking white water (pH=4.85) was obtained from Bowater Ponderay (Usk, Wash. USA). Newsprint pulp de-inking white water was obtained from Bowater Coosa Pines (Coosa Pines, Ala. USA).

Float Test

A filter paper float test was carried out to study catalase deactivation performance of aldehyde-functional polymers and a conventional catalase inhibitor on bleached paper. In a typical float test, a one-inch square piece of filter paper was saturated with 50% $H_2O_2$ solution. With excess $H_2O_2$ solution being removed, the treated filter paper was submerged in 200 mL aqueous catalase solution or 200 mL de-inking white water. The catalase solution was prepared by diluting a commercial catalase solution with either distilled water or papermaking white water. Various amounts of the catalase inhibitors being studied were mixed with the catalase solution or de-inking white water for five minutes before the treated filter paper was submerged in the catalase solution or de-inking white paper. Controls also were carried out in which no catalase inhibitor was added to the catalase solution or de-inking paper before the treated filter was submerged therein. The time that was required for the filter paper to rise to the solution surface was recorded and used to determine $H_2O_2$ decomposition rate. A longer time for the filter paper to rise to the surface indicated a slower $H_2O_2$ decomposition rate.

Preliminary Observations

As an initial observation made with respect to the controls that contained no catalase inhibitor, a significant difference was observed between the papermaking and de-inking sources of white water with respect to wild catalase content. The de-inking white water contained a large amount of wild catalase whereas the papermaking white water did not contain wild catalase. The presence of wild catalase in the de-inking white water was confirmed by the float tests. It only took about 40 seconds for the peroxide-treated filter paper to rise to the surface of the de-inking white water that had not been treated with catalase inhibitor (e.g., see Control A, Table 4 below). However, after de-inking white water was heated at around 195° F. for 5-10 minutes to denature wild catalase, it was observed that the peroxide-treated filter did not rise to the heat treated water surface over a period of 16 hours. This indicated that hydrogen peroxide decomposition in the de-inking white water was caused by wild catalase, and not caused by other contaminants, such as metal ions.

Results

Example 1

Float Test of Catalase De-Activation Using Distilled Water

Catalase de-activation performance of a glyoxalated polyacrylamide (G-PAM) and glutaraldehyde was tested with the filter paper float test using distilled water. As indicated, in a typical test, a square piece of filter was first saturated with 50% $H_2O_2$ solution. Various amounts of the two types of catalase inhibitors being studied in this example were mixed with the catalase solution prepared with distilled water for five minutes before the treated filter paper was submerged in the catalase solution. Once the treated filter paper was submerged in catalase solution, catalase started decomposing $H_2O_2$ molecules, releasing $O_2$ gas. The faster the $H_2O_2$ decomposition rate, the faster the $O_2$ gas being generated, and the shorter the time required for the filter paper to rise to the solution surface. On the other hand, the presence of catalase inhibition will slow down the $H_2O_2$ decomposition rate, resulting in longer periods of time for the filter paper to rise to the surface.

Table 1 presents the results of the float tests conducted with 20 μL commercial catalase TERMINOX® Ultra 50L diluted by 1000 mL distilled water to prepare the catalase solution. As indicated, glutaraldehyde and glyoxalated polyacrylamide were studied as the catalytic inhibitors. Glutaraldehyde was chosen as a control for this example. Large quantities of glutaraldehyde are commercially used as a catalase inhibitor. BUBOND® 387 was the source of the glyoxalated polyacrylamide.

TABLE 1

Float test of catalase de-activation using distilled water.

| Control | | Catalase Solution with G-PAM | |
|---|---|---|---|
| | | Glyoxalated | |
| Glutaraldehyde (ppm) | Float time (sec) | polyacrylamide (ppm) | Float time (sec) |
| 0 | 75 | 0 | 75 |
| 50 | 80 | 7.5 | 63 |
| 100 | 72 | 15 | 116 |
| 150 | 88 | 22.5 | 139 |
| 200 | 103 | 30 | 137 |
| 300 | 117 | 45 | 137 |
| 500 | 128 | 60 | 134 |
| — | — | 75 | 157 |

As shown by the results in Table 1, at below 100 ppm, glutaraldehyde did not affect catalase activity and filter paper float time remained at around 75 seconds. When glutaraldehyde concentration was increased from 100 ppm to 500 ppm, filter paper float time increased gradually to 128 seconds. In contrast, the glyoxalated polyacrylamide (BUBOND® 387) significantly inhibited catalase activity at much lower concentration. At only 22.5 ppm, BUBOND® 387 increased filter float time to 139 seconds. Further, increasing BUBOND® 387 concentration to 75 ppm increased the float time to 157 seconds. Thus, with the present invention, a low ppm level achieved a longer float time.

Example 2

Float Test of Catalase De-Activation Using Papermaking White Water

Papermaking process water (white water) contains large amount of dissolved and colloidal substances, which have been shown to interfere with many added chemicals. To test the effect of dissolved and colloidal substances on catalase inhibitors, float tests were also carried out with the white water obtained from a newsprint papermaking mill. Various amounts of the catalase inhibitors being studied for this example were mixed with the catalase solution for five minutes before the treated filter paper was submerged in the catalase solution. Table 2 presents the results of float tests conducted using 20 μL commercial catalase TERMINOX® Ultra 50L diluted with 1000 mL papermaking white water obtained from Bowater Ponderay. Table 3 presents the results of float tests conducted using a lower dosage of TERMINOX® Ultra 50L catalase (10 μL), which was also diluted with 1000 mL papermaking white water.

TABLE 2

Float test of catalase de-activation using papermaking white water (20 μL catalase/1000 mL papermaking white water).

| Control | | Papermaking White Water with G-PAM | |
|---|---|---|---|
| | | Glyoxalated | |
| Glutaraldehyde (ppm) | Float time (sec) | polyacrylamide (ppm) | Float time (sec) |
| 0 | 67 | 0 | 67 |
| 500 | 130 | 75 | 130 |

TABLE 3

Float test of catalase de-activation using papermaking white water (10 μL catalase/1000 mL papermaking white water).

| Control | | Papermaking White Water with G-PAM | |
|---|---|---|---|
| | | Glyoxalated | |
| Glutaraldehyde (ppm) | Float time (sec) | polyacrylamide (ppm) | Float time (sec) |
| 0 | 197 | 0 | 197 |
| 500 | 301 | 75 | 290 |

As shown by the results in Tables 2 and 3, at both catalase concentrations, 75 ppm glyoxalated polyacrylamide gave comparable catalase inhibiting performance to 500 ppm glutaraldehyde.

Example 3

Float Test of Catalase De-Activation Using De-Inking White Water

Float tests were also carried out with the de-inking white water obtained from a papermaking mill. Various amounts of the catalase inhibitors being studied for this example were mixed with the de-inking white water for five minutes before the treated filter paper was submerged in the de-inking white water. Table 4 shows the effect of various catalase inhibitors on the deactivation of wild catalase in de-inking white water obtained from Bowater Coosa Pines. Table 5 shows the effect of catalase inhibitor and a bactericide, BUSAN® 1078, combination on wild catalase in the de-inking white water. For purposes of the studies having results reported in Table 5, the de-inking white water was pre-treated with 1000 ppm BUSAN® 1078 for 30 minutes before the float test. The objective was to simulate a realistic production situation in which a catalase inhibitor was commonly applied together with a bactericide. Control tests also were included in which no catalase inhibitor was added to the de-inking white water.

TABLE 4

Float test of catalase de-activation using de-inking white water.

| Product | Catalase Inhibitor Added to De-Inking White Water | Dosage (ppm) | Float time (sec) |
|---|---|---|---|
| Control A | None | NA | 39 |
| Control 1 | Glutaraldehyde | 2000 | 68 |
| 1 | BUBOND ® 387 | 300 | 87 |
| 2 | BUBOND ® 644 | 300 | 56 |
| 3 | BUBOND ® 376 | 300 | 87 |
| 4 | BUBOND ® 376C | 300 | 84 |

TABLE 5

Float test of catalase de-activation using de-inking white water pre-treated with bactericide.

| Product | Catalase Inhibitor Added to De-Inking White Water | Dosage (ppm) | Float time (sec) |
|---|---|---|---|
| Control B | None | NA | 35 |
| Control 2 | Glutaraldehyde | 2000 | 40 |
| Control 3 | Glutaraldehyde | 4000 | 37 |
| 5 | BUBOND ® 387 | 600 | 40 |
| 6 | BUBOND ® 644 | 600 | 131 |
| 7 | BUBOND ® 376 | 600 | 55 |
| 8 | BUBOND ® 376C | 600 | 83 |

As shown by the results in Tables 4 and 5, various glyoxalated polyacrylamide products provided comparable or slightly superior performance than glutaraldehyde when used at only approximately 15% by weight of the glutaraldehyde usage level.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of controlling enzymatic decomposition of peroxide,
    comprising contacting a composition comprising at least one peroxide decomposing enzyme with at least one aldehyde functional polymer added in an amount effective to control said at least one peroxide decomposing enzyme, wherein said aldehyde functional polymer is added to said composition before adding hydrogen peroxide to said composition, wherein said hydrogen peroxide and said aldehyde functional polymer are simultaneously present in said composition, and wherein said aldehyde functional polymer comprises the reaction product of an aldehyde and a polyvinylamide or a polyacrylamide.

2. The method of claim 1, wherein said aldehyde functional polymer comprises the reaction product of an aldehyde and a polyvinylamide.

3. The method of claim 1, wherein said aldehyde functional polymer comprises the reaction product of an aldehyde and a polyacrylamide.

4. The method of claim 1, wherein said aldehyde is formaldehyde, glutaraldehyde, glyoxal, malonic dialdehyde, succinic dialdehyde, glutaraldehyde, adipic dialdehyde, 2-hydroxy adipic dialdehyde, pimelic dialdehyde, suberic dialdehyde, azelaic dialdehyde, sebacic dialdehyde, maleic aldehyde, fumaric aldehyde, phthalaldehyde, isophthalaldehyde, terephthalaldehyde, or 1,4-diformylcyclohexane.

5. The method of claim 1, wherein said polymer having aldehyde functionality wherein the aldehyde functionality is derived from a dialdehyde.

6. The method of claim 1, wherein said at least one peroxide decomposing enzyme is catalase, peroxidase, protease, amylase, cellulase, or a combination thereof.

7. The method of claim 1, wherein said at least one peroxide decomposing enzyme is catalase.

8. The method of claim 1, wherein the composition is a water process stream in a recycling mill, a textile treatment process, a bleaching process, a pulping process, or a deinking process.

9. The method of claim 1, wherein said composition further comprises a cellulose pulp.

10. The method of claim 9, wherein said aldehyde functional polymer is added to said composition in an amount of about 1 ppm to about 8,000 ppm.

11. The method of claim 9, wherein the cellulose pulp is kraft pulp, sulfite pulp, sulfate pulp, soda pulp, mechanical pulp, thermomechanical pulp, chemothermomechanical pulp, recycled paper pulp, or a combination thereof.

12. The method of claim 1, wherein said composition further comprises a cellulose pulp and said hydrogen peroxide bleaches said cellulose pulp.

13. A method for bleaching cellulose pulp from recycled paper,
    comprising treating a recycled fiber pulp with an aldehyde functional polymer introduced in an amount effective to control peroxide decomposing enzymes present in said pulp, and bleaching said recycled fiber pulp with hydrogen peroxide, wherein said aldehyde functional polymer is added to said recycled fiber pulp before adding said hydrogen peroxide to said recycled fiber pulp, and wherein said aldehyde functional polymer comprises the reaction product of an aldehyde and a polyvinylamide or a polyacrylamide.

14. The method of claim 13, wherein said aldehyde functional polymer is added in an amount of from about 1 ppm to about 8,000 ppm.

15. The method of claim 13, wherein said aldehyde functional polymer is added in an amount of from about 5 ppm to about 4,000 ppm.

16. The method of claim 13, wherein said aldehyde functional polymer comprises the reaction product of an aldehyde and a polyvinylamide.

17. The method of claim 13, wherein said aldehyde functional polymer comprises the reaction product of an aldehyde and a polyacrylamide.

18. The method of claim 17, wherein said aldehyde is formaldehyde or glutaraldehyde.

19. The method of claim 13, wherein said at least one peroxide decomposing enzyme is catalase.

20. The method of claim 13, wherein said aldehyde functional polymer is introduced into process water used for the production of said recycled fiber pulp.

21. The method of claim 13, wherein said aldehyde functional polymer is introduced into raw feed water used in the production of said recycled fiber pulp.

22. The method of claim 13, wherein said aldehyde functional polymer is introduced into a pulper used for the production of said recycled fiber pulp.

23. The method of claim 13, wherein the aldehyde functional polymer is added in a water loop of a paper mill.

* * * * *